US008393430B2

(12) United States Patent  
Matsuzawa

(10) Patent No.: US 8,393,430 B2
(45) Date of Patent: Mar. 12, 2013

(54) MOTORCYCLE

(75) Inventor: Torao Matsuzawa, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1204 days.

(21) Appl. No.: 12/193,930

(22) Filed: Aug. 19, 2008

(65) Prior Publication Data

US 2009/0050421 A1 Feb. 26, 2009

(30) Foreign Application Priority Data

Aug. 20, 2007 (JP) ................. 2007-214111

(51) Int. Cl.
*B62D 61/02* (2006.01)
(52) U.S. Cl. ....................................................... 180/219
(58) Field of Classification Search .............. 180/219; 280/272; 188/24.11; 74/523–525, 543–548, 74/557, 501.6, 488
See application file for complete search history.

(56) References Cited

U.S. PATENT DOCUMENTS

| 3,964,564 | A | * | 6/1976 | Pittarelli ..................... 180/219 |
| 5,052,524 | A | * | 10/1991 | Husted ...................... 188/24.11 |
| 6,450,301 | B1 | * | 9/2002 | Iizuka et al. ..................... 188/26 |
| 7,232,014 | B2 | * | 6/2007 | Nakaie .......................... 188/71.1 |
| 7,334,666 | B2 | * | 2/2008 | Nakaie et al. ............... 188/73.38 |
| 7,350,881 | B2 | * | 4/2008 | Asahi ............................. 303/137 |
| 7,533,752 | B2 | * | 5/2009 | Mochizuki et al. ........... 180/219 |
| 7,661,502 | B2 | * | 2/2010 | Miki et al. ..................... 180/219 |
| 7,722,130 | B2 | * | 5/2010 | Takeuchi ..................... 303/9.64 |
| 2002/0029940 | A1 | * | 3/2002 | Iizuka et al. ............... 188/24.11 |
| 2005/0134114 | A1 | * | 6/2005 | Asahi ............................. 303/137 |
| 2005/0139434 | A1 | * | 6/2005 | Nakaie .......................... 188/71.1 |
| 2008/0011563 | A1 | * | 1/2008 | Yamamoto .................... 188/265 |
| 2009/0014258 | A1 | * | 1/2009 | Tseng ......................... 188/24.16 |

FOREIGN PATENT DOCUMENTS

JP 11-301559 11/1999

* cited by examiner

*Primary Examiner* — Tashiana Adams
(74) *Attorney, Agent, or Firm* — Keating & Bennett, LLP

(57) ABSTRACT

A motorcycle has a rear wheel brake lever provided on a handlebar and a rear wheel brake provided on a rear wheel. A rear wheel brake cable is connected to the rear wheel brake lever and the rear wheel brake. A main frame extends toward the rear part from the front part of the motorcycle. The main frame is disposed at a center in a vehicle width direction and extends toward the rear part of the vehicle body on the upper side of an engine unit. The rear wheel brake cable is laid toward the rear part from the front part of the vehicle body along the main frame. The transmitting loss of brake operation is thereby reduced and swing of the rear wheel brake cable is prevented.

8 Claims, 12 Drawing Sheets

MOTORCYCLE

RELATED APPLICATIONS

This application claims the benefit of priority under 35 USC 119 of Japanese patent application no. 2007-214111, filed on Aug. 20, 2007, which is hereby incorporated by reference.

BACKGROUND OF THE INVENTION

1. Field of the Invention

The present invention relates to a technique for mounting a brake cable to a motorcycle.

2. Description of Related Art

A motorcycle is known that has a brake lever provided on a handlebar that is connected to a rear wheel brake through a brake cable. When a driver's brake operation is transmitted to the rear wheel brake by the brake cable, a transmitting loss of the brake operation may be generated by friction between an inner cable and an outer cable covering the inner cable, and the extension of the inner cable or the like. In order to reduce such transmitting loss, the brake cable is preferably laid at a center in a vehicle width direction to reduce the number of portions at which the brake cable is bent and to shorten the brake cable. In Japanese Unexamined Patent Publication No. 11-301559, in a motorcycle provided with a pair of right and left main frames, for example, a rear wheel brake cable is passed through a concave part is formed in an upper part of an engine such that the rear wheel brake cable lays at the center in the vehicle width direction.

Although the brake cable is centered in JP 11-301559, it may be largely swung by vibration of the vehicle body. The brake cable must be supported at a plurality of locations in order to prevent such swing. However, because the temperature of the engine increases during vehicle operation, and the concave part through which the cable is passed is formed in the engine, the brake cable cannot be supported near the concave part, and swing of the brake cable is easily generated.

SUMMARY OF THE INVENTION

The present invention addresses these problems and provides a motorcycle that reduces the transmitting loss of brake operation and prevents swing of a brake cable.

A motorcycle according to the present invention includes a rear wheel brake lever provided on a handlebar and a rear wheel brake provided on a rear wheel. A brake cable has a front end part connected to the rear wheel brake lever and a rear end part connected to the rear wheel brake. A main frame extends toward a rear part from a front part of the motorcycle. The main frame, which is disposed at a center in a vehicle width direction, extends toward the rear part of the motorcycle on an upper side of an engine unit. The brake cable extends toward the rear part from the front part of the motorcycle along the main frame.

Since the brake cable extends along the main frame disposed at the center in the vehicle width direction according to the present invention, the brake cable has no wasteful length, and the transmitting loss of the brake operation is reduced. The brake cable is supported by the main frame and swing of the brake cable is prevented.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
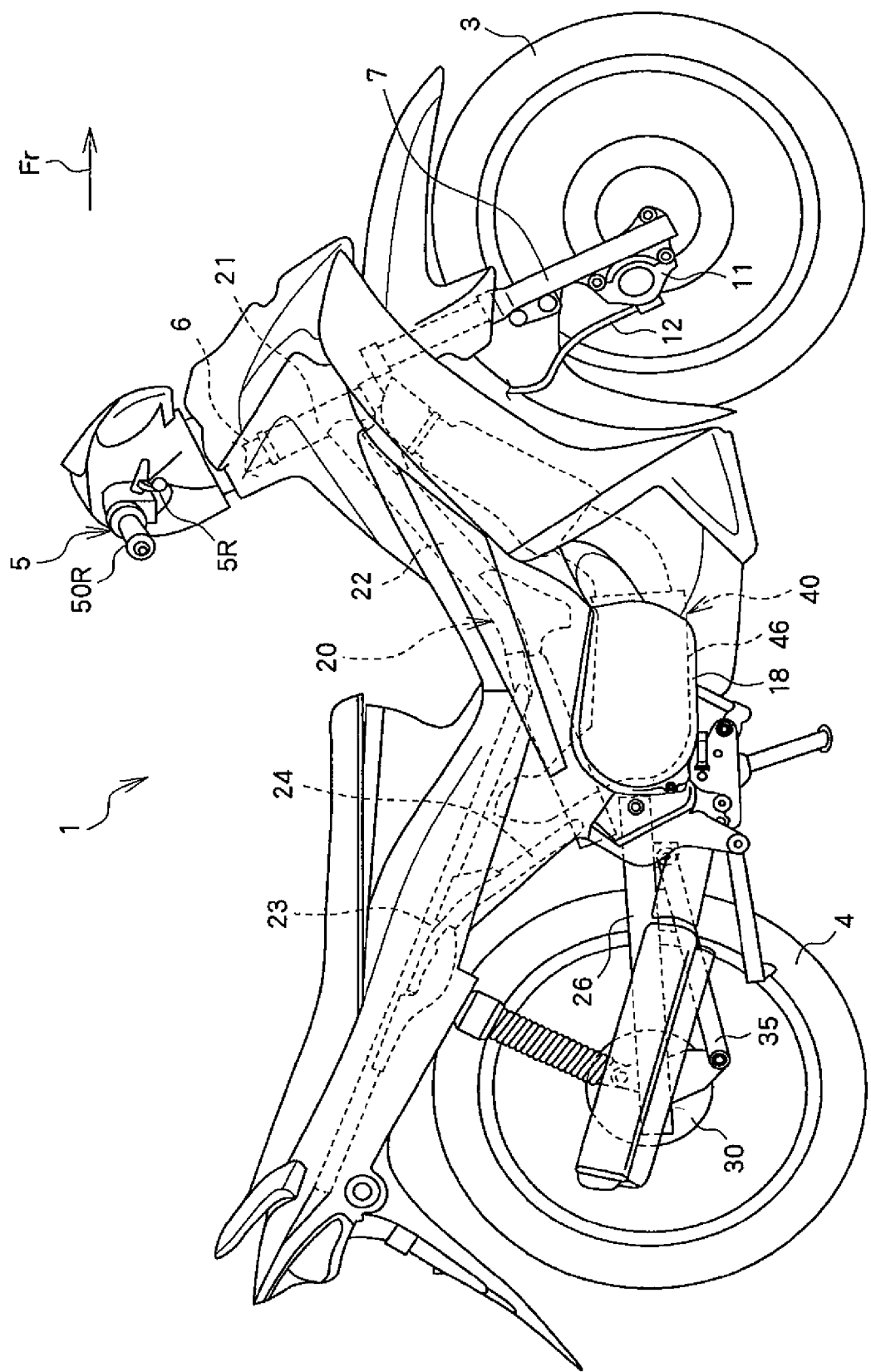
FIG. 1 is a side view of a motorcycle according to an embodiment of the present invention.
Figure 2:
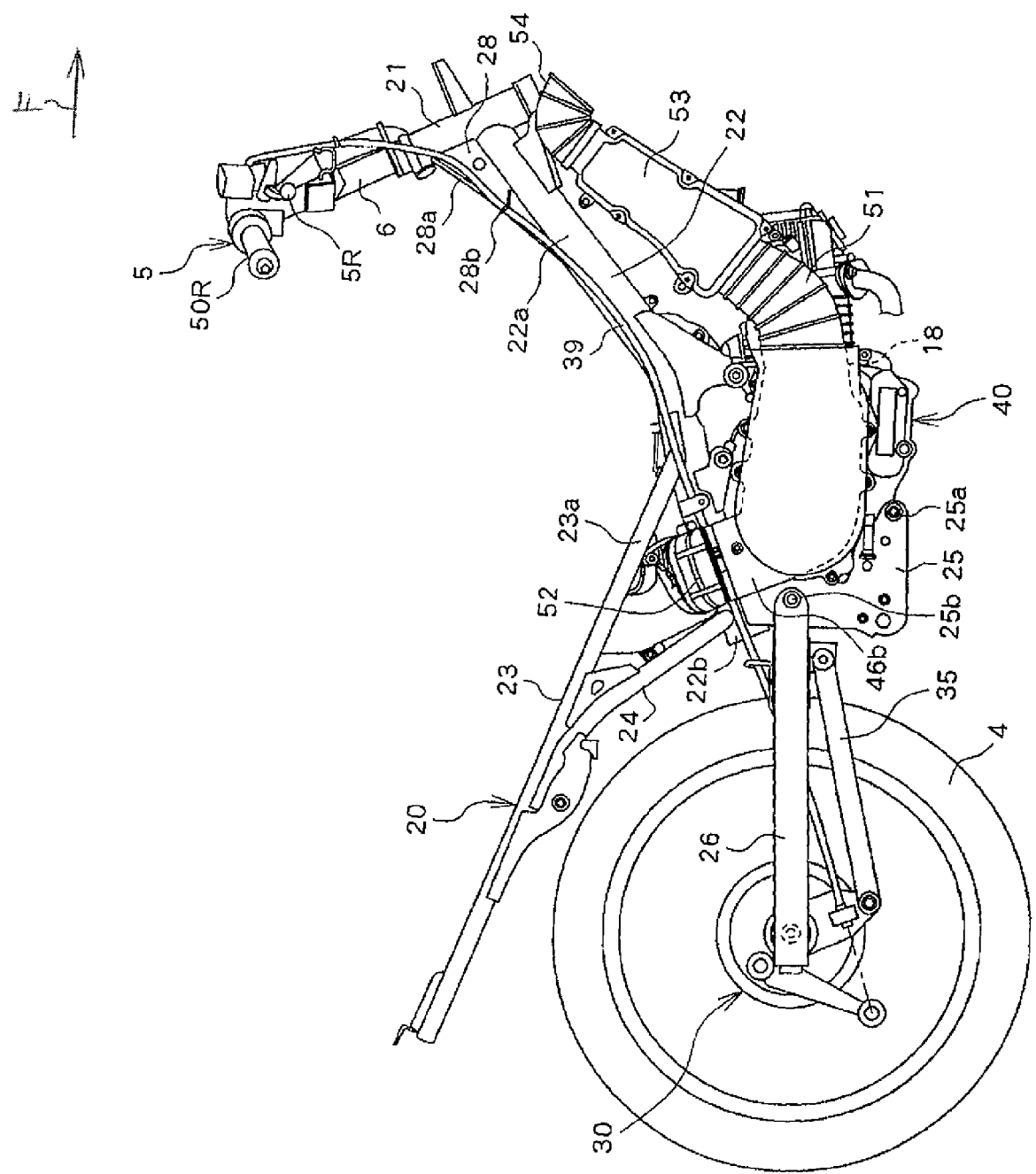
FIG. 2 is a side view showing an engine unit and a vehicle body frame of the motorcycle.
Figure 3:
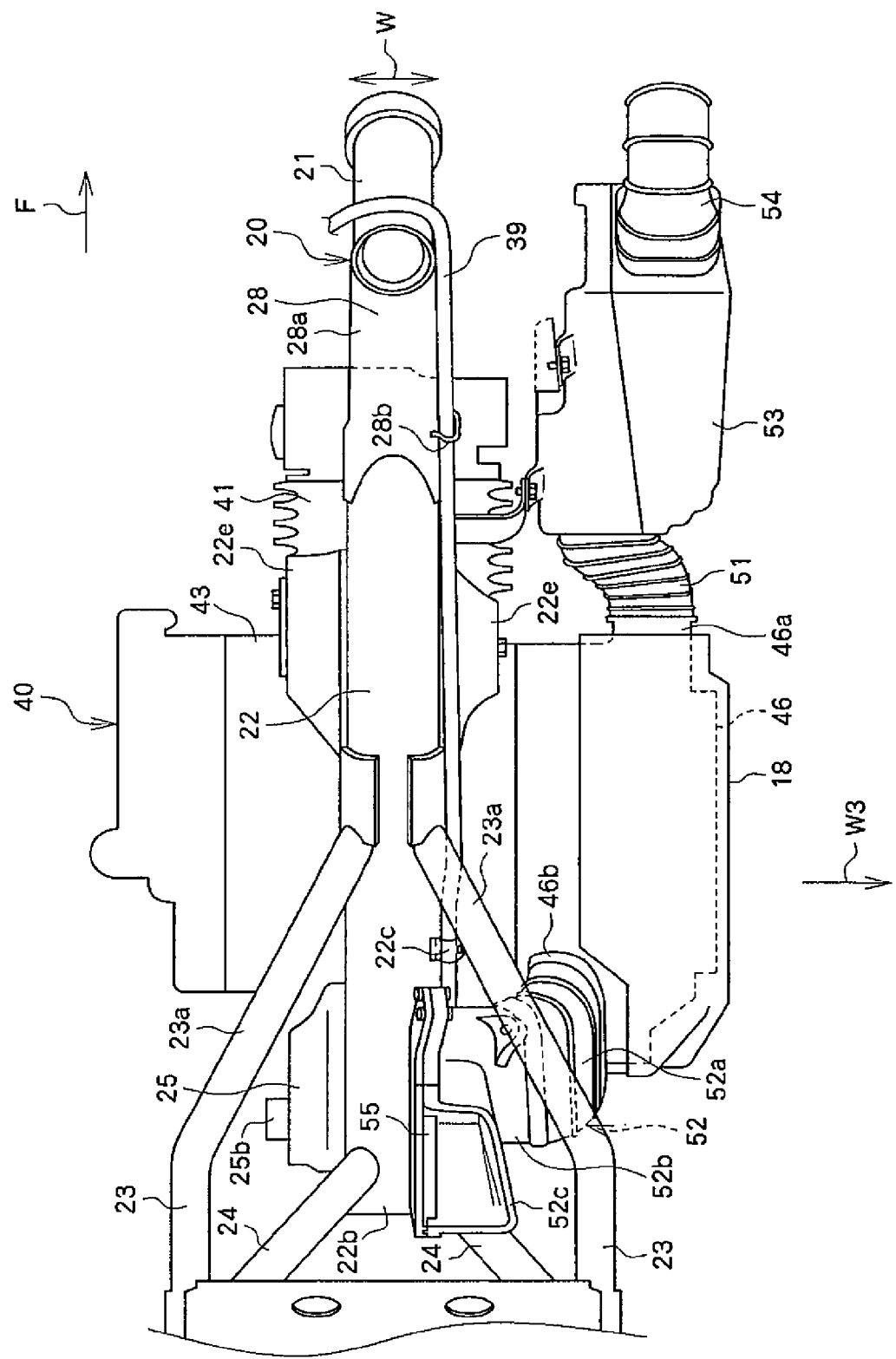
FIG. 3 is a plan view showing the engine unit and the vehicle body frame.
Figure 4:
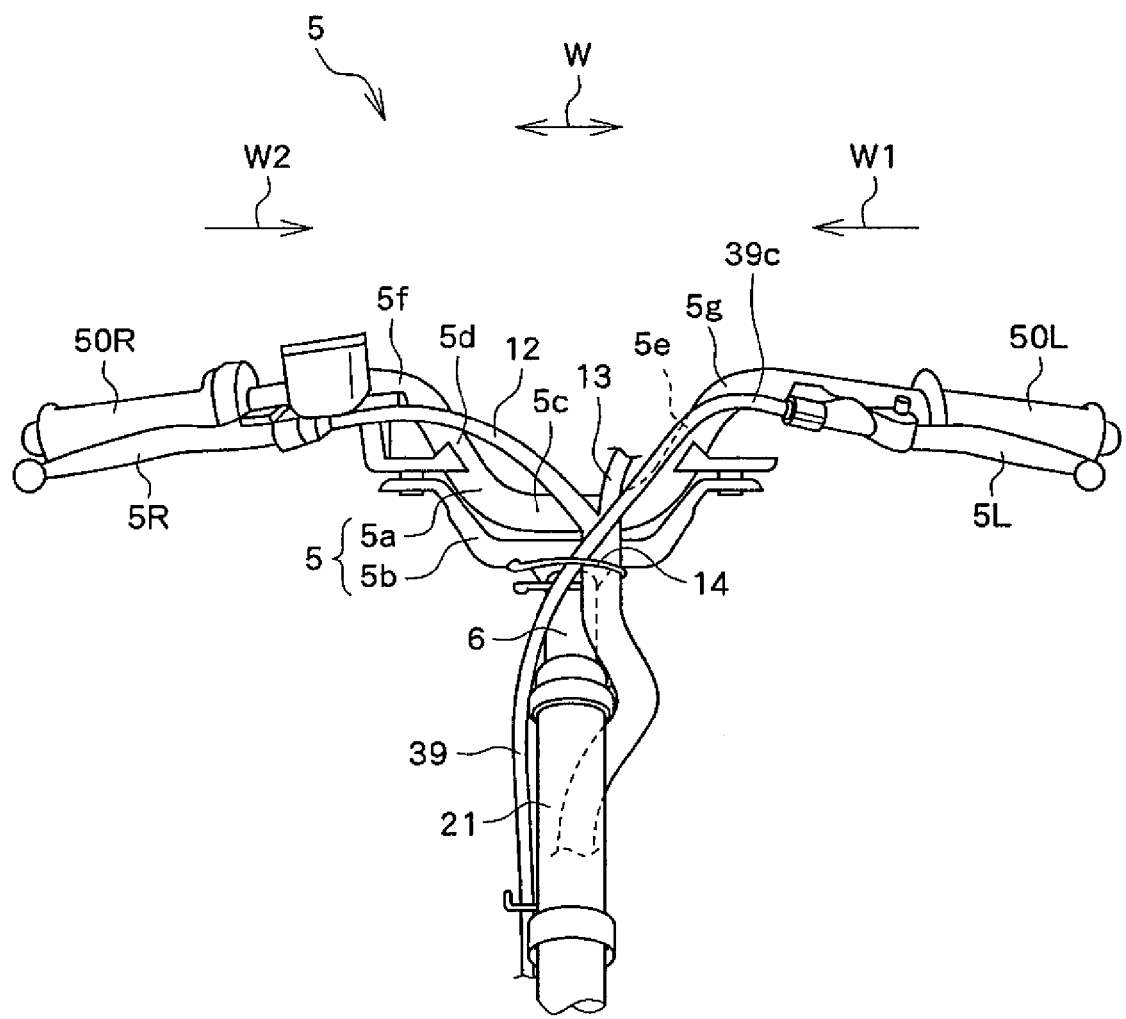
FIG. 4 is a front view of a handlebar of the motorcycle.
Figure 5:
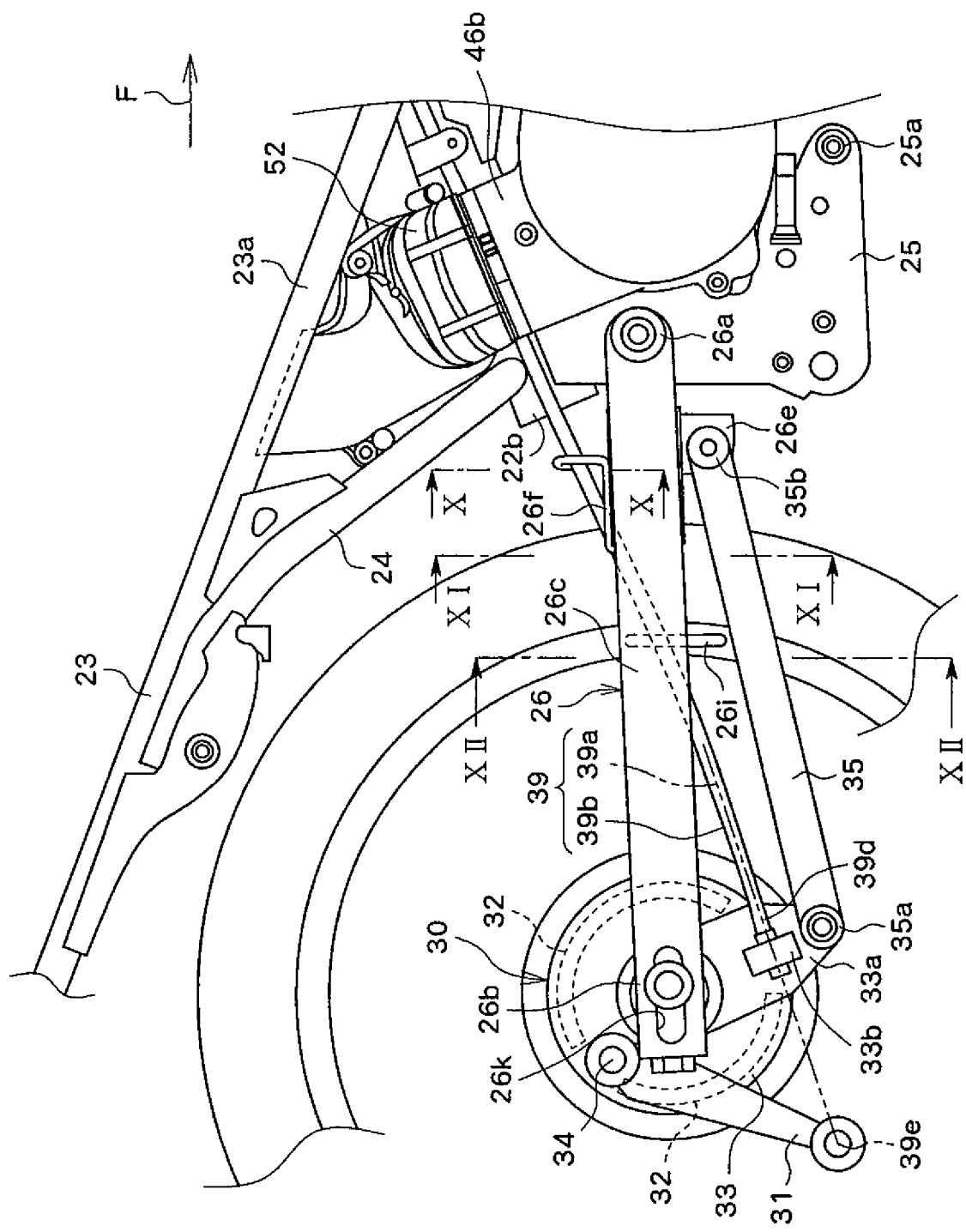
FIG. 5 is a side view of the rear part of the motorcycle.
Figure 6:
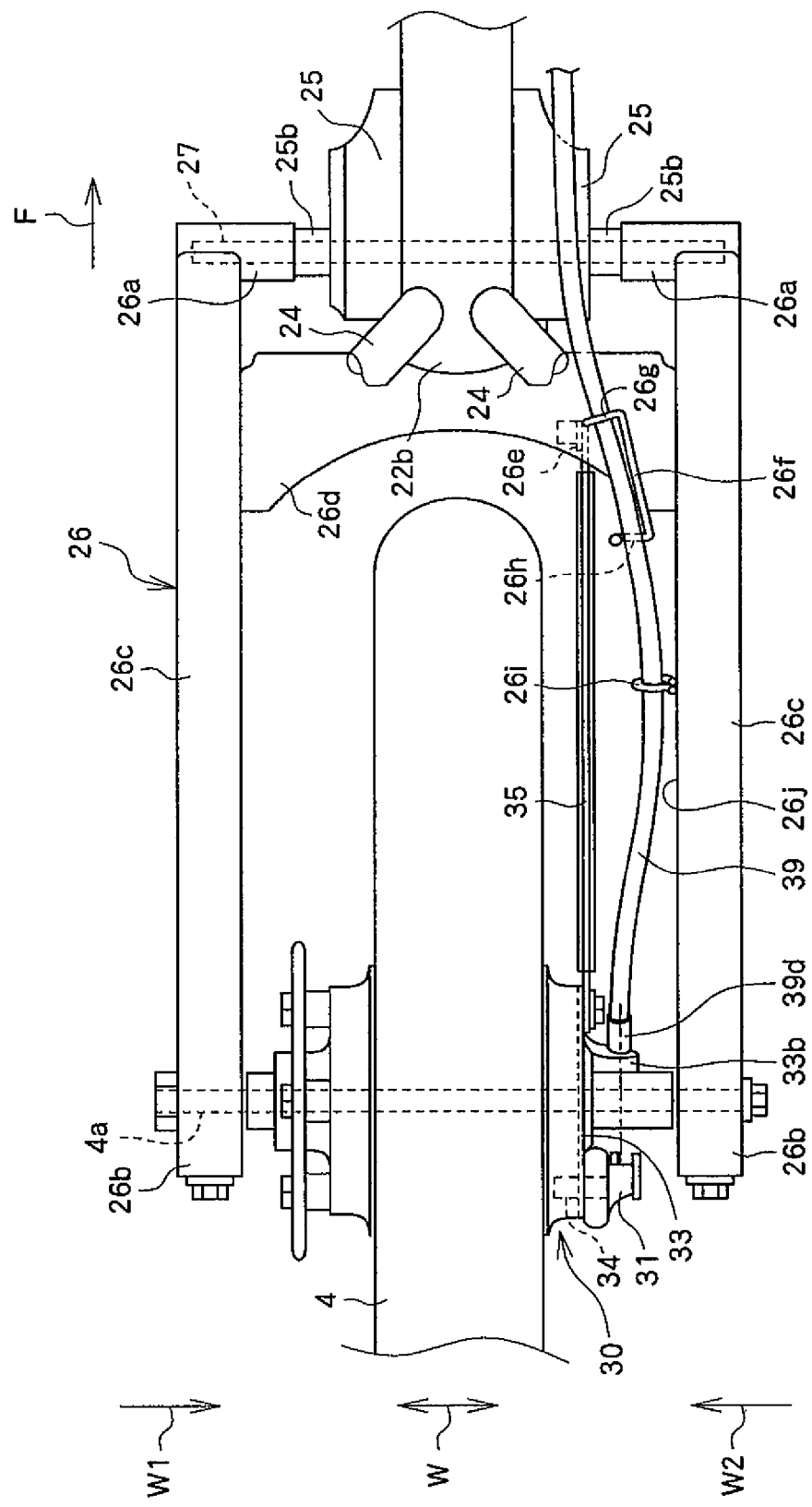
FIG. 6 is a plan view showing a rear arm and a rear wheel of the motorcycle.
Figure 7:
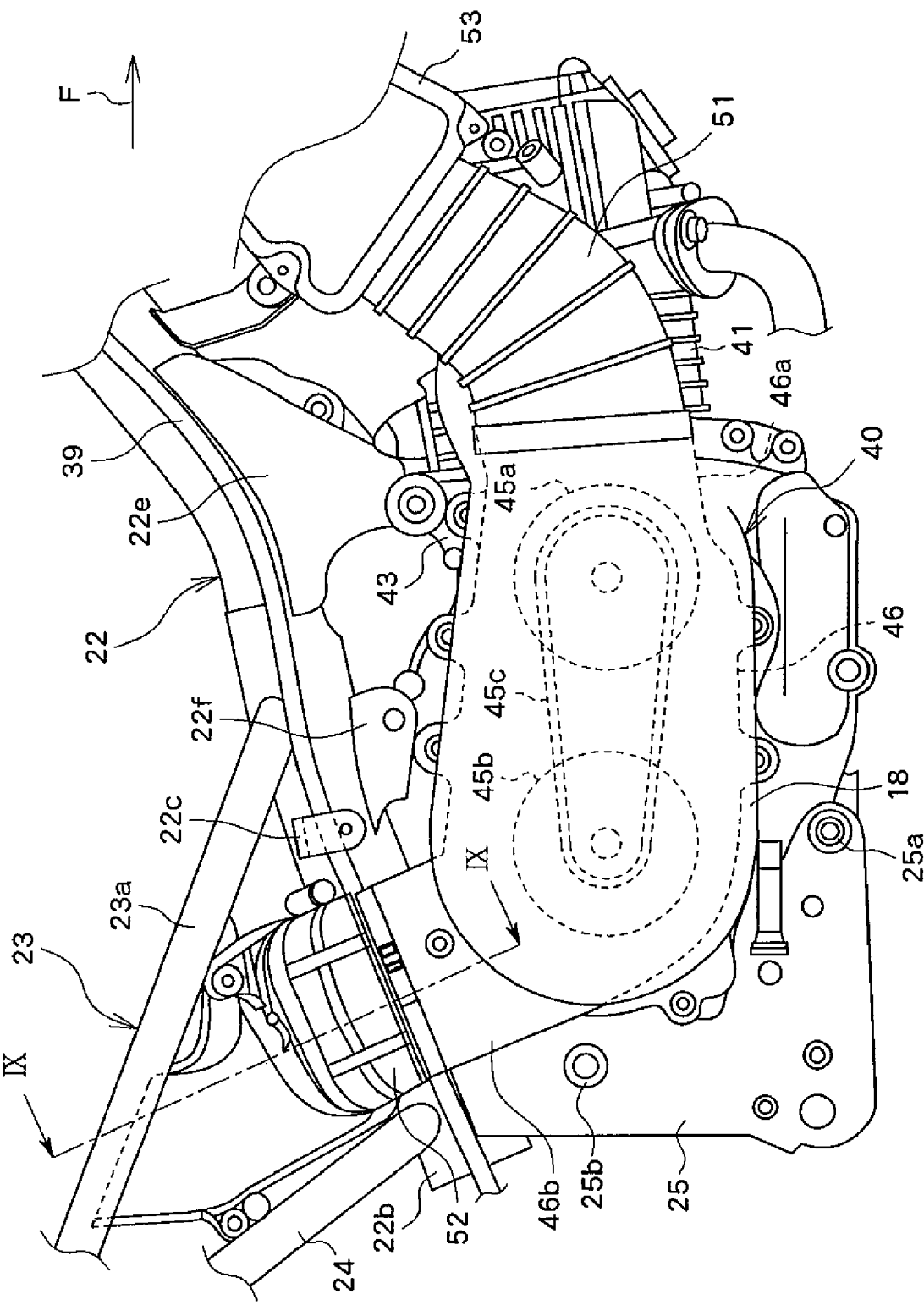
FIG. 7 is a side view of the engine unit.

An embodiment of the present invention is now described with reference to the drawings. FIG. 1 is a side view of a motorcycle 1 according to an embodiment of the present invention. FIG. 2 is a side view showing a vehicle body frame 20 and an engine unit 40 of motorcycle 1. FIG. 3 is a plan view of vehicle body frame 20 and engine unit 40. FIG. 4 is a front view of a handlebar 5 provided on the front part of the motorcycle. FIG. 5 is a side view of the rear part of the motorcycle. FIG. 6 is a plan view showing a rear wheel 4 and a rear arm 26. FIG. 7 is a side view of engine unit 40.

As shown in FIG. 1, motorcycle 1 includes vehicle body frame 20) a front wheel 3, rear wheel 4, a handlebar 5 and engine unit 40. As shown in FIG. 2, motorcycle 1 further includes a rear wheel brake 30 and a rear wheel brake cable 39.

As shown in FIGS. 2 and 3, vehicle body frame 20 includes a steering head 21, a main frame 22, right and left seat rails 23, 23, stays 24, 24 and brackets 25, 25.

Steering head 21, which is provided on the front end part of vehicle body frame 20, extends in a slanting vertical direction. Steering head 21, which is located at a center in a vehicle width direction (direction W in FIG. 3), rotatably supports a steering shaft 6 extending in the slanting vertical direction as in steering head 21 (FIG. 4). A front fork 7 is connected to a lower end part of steering shaft 6. A lower end part of front fork 7 supports front wheel 3.

An upper end part of steering shaft 6 is connected to the center part of handlebar 5 in a width direction. Handlebar 5 has a handlebar 5a extending in the vehicle width direction, and a connecting member 5b disposed below and mounted to handlebar 5a. An upper end part of steering shaft 6 located at the center in the vehicle width direction is connected to a central part of connecting member 5b.

Handlebar 5a includes bending parts 5f and 5g and inclining parts 5d and 5e. A right grip 50R and a left grip 50L that are gripped by a driver are provided on handlebar 5. Handlebar 5a, which extends to the central part side in the vehicle width direction from left grip 50L (direction W1 in FIG. 4), is bent in a downwardly slanting direction at bending part 5g. Inclining part 5e following bending part 5g extends in a downwardly slanting direction toward a central part 5c of handlebar 5a. Handlebar 5a, which extends to the center part side in the vehicle width direction from right grip 50R (direction W2 in FIG. 4), is bent in a downwardly slanting direction at bending part 5*f*. Inclining part 5*d* following bending part 5*f* extends in a downwardly slanting direction toward central part 5*c* of handlebar 5.

As shown in FIG. 4, a front wheel brake lever 5R is disposed in front of right grip 50R (the traveling direction of the vehicle). A front wheel brake 11 braking front wheel 3 is provided on front wheel 3 (FIG. 1). Front wheel brake 11 is, for example, a brake caliper that sandwiches a brake disc rotating with front wheel 3 to generate braking force. Front wheel brake lever 5R is connected to front wheel brake 11 through a hydraulic tube 12 (FIGS. 1 and 4).

As shown in FIG. 4, rear wheel brake lever 5L that operates rear wheel brake 30 is disposed in front of left grip 50L. Rear wheel brake cable 39, which is connected to rear wheel brake lever 5L and rear wheel brake 30, transmits the operation of rear wheel brake lever 5L carried out by the driver to rear wheel brake 30. Rear wheel brake cable 39 is described in detail later.

As shown in FIG. 2, a front end part of main frame 22 is connected to steering head 21. Main frame 22 extends in a downwardly slanting direction toward the rear part of the vehicle body (a direction opposite to direction F in FIG. 2) from the front end part of main frame 22. Main frame 22 has a rear (lower) end part 22*b* located on the front of rear wheel 4. Main frame 22, which is disposed at the center in the vehicle width direction, is located above engine unit 40 (FIG. 3). A front part 22*a* of main frame 22 has an upper wall having a reinforcement part 28 extending in a slanting vertical direction with front part 22*a*. A front end part of reinforcement part 28 is mounted to the peripheral surface of steering head 21.

As shown in FIGS. 2 and 3, a front end part of seat rail 23 is connected to an intermediate position of main frame 22. Seat rail 23 slants upward toward the rear part of the vehicle body from the front end part of seat rail 23. A front part 23*a* of seat rail 23 extends outwardly in the vehicle width direction toward the rear part of the vehicle body from a front end part of seat rail 23 (FIG. 3).

As shown in FIG. 2, front end parts of right and left stays 24 are connected to a rear end part 22*b* of main frame 22. Stay 24 slants upward from the front end part of stay 24 and is connected at an upper end part to seat rail 23.

Bracket 25 has a plate shape and is joined at an upper edge part to rear end part 22*b* of main frame 22. Bracket 25 outwardly spreads in the vehicle width direction from the upper edge part of bracket 25, and then extends downwardly (FIGS. 6 and 7). As shown in FIG. 7, a mounted part 25*a* is provided on the front side of the lower end part of bracket 25. A downwardly projecting bracket 22*e* is mounted to the vicinity of the central part of main frame 22. A bracket 22*f* that downwardly projects like bracket 22*e* is mounted to main frame 22 in the back of bracket 22*e*. An upper wall of a front part of a crankcase 43 of engine unit 40 is mounted to bracket 22*e*. An upper wall of a rear part of crankcase 43 is mounted to bracket 22*f*. A lower part of crankcase 43 is mounted to mounted part 25*a* of bracket 25. While pairs of right and left brackets 22*e* and 22*f* are provided, FIG. 7 shows only the right brackets 22*e* and 22*f*.

As shown in FIG. 6, a support part 25*b* provided in an upper part of bracket 25 supports a pivot shaft 27 extending in the vehicle width direction. Rear arm 26 is mounted to pivot shaft 27 and has a pair of right and left arm parts 26*c*, 26*c* extending in the longitudinal direction of the vehicle body. Arm parts 26*c*, 26*c* have front end parts 26*a*, 26*a* mounted to pivot shaft 27 and rear end parts 26*b*, 26*b* supporting an axle 4*a* of rear wheel 4. As shown in FIG. 5, axle 4*a* is inserted into an elongated hole 26*k* of rear end part 26*b*. Hole 26*k* is long in the longitudinal direction of the vehicle body and can adjust the position of rear wheel 4 in the longitudinal direction of the vehicle body. Rear arm 26 vertically oscillates with rear wheel 4 with pivot shaft 27 as a supporting point independently of engine unit 40 and vehicle body frame 20.

As shown in FIG. 5, rear wheel brake 30 is provided on rear wheel 4. In this example, rear wheel brake 30 is a drum brake having a disk-shaped drum cover 33, a pair of brake shoes 32, 32, a cam shaft 34 and a cam shaft lever 31. Drum cover 33 blocks a brake drum rotating with rear wheel 4 from the side. Brake shoes 32, 32 are pressed to the inner peripheral surface of the brake drum to generate braking force. Cam shaft 34 rotates a cam push-expanding brake shoes 32, 32 to operate a brake. Cam shaft lever 31 rotates cam shaft 34 according to the driver's brake operation. Cam shaft 34 is mounted to a first end of cam shaft lever 31.

Rear wheel brake cable 39 has an inner cable 39*a* and an outer cable 39*b* that covers inner cable 39*a*. A rear end part 39*e* of inner cable 39*a* is connected to a second end of cam shaft lever 31.

As shown in FIG. 5, a rod 35 that is provided on the rear part of motorcycle 1 extends in the longitudinal direction. A rear end part 35*a* of rod 35 is mounted to a mounted part 33*a* integrally molded with drum cover 33. A front end part 35*b* of rod 35 is mounted to rear arm 26. As shown in FIG. 6, a cross part 26*d* is provided on a front part of rear arm 26 to reinforce rear arm 26. Cross part 26*d* extends in the vehicle width direction and is bridged between right and left arm parts 26*c*, 26*c*. A rod support part 26*e*, which is joined to cross part 26*d*, is downwardly projected (FIG. 5). Front end part 35*b* of rod 35 is mounted to rod support part 26*e*. Rod 35 regulates rotation of drum cover 33 of rear wheel brake 30 in interlock with rear wheel 4.

Figure 8:
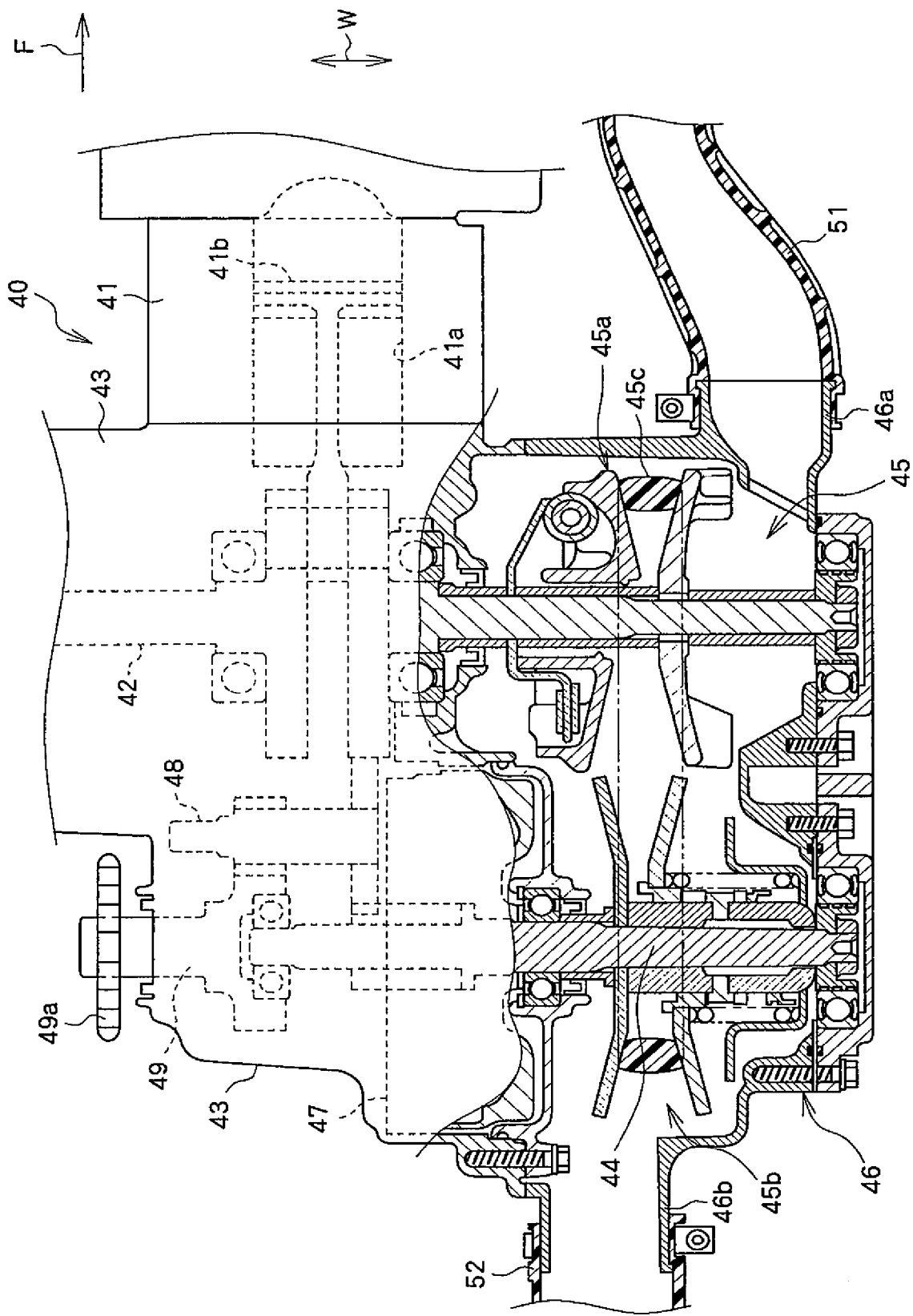
FIG. 8 is a partial sectional view of the engine unit.

As described above, engine unit 40 is supported by main frame 22 and bracket 25 on the front side relative to rear wheel 4, below the rear part of main frame 22. FIG. 8 is a partial sectional view of engine unit 40. As shown in FIG. 8, engine unit 40 includes an engine 41 and a belt type continuously variable transmission 45.

A cylinder 41*a* is formed in engine 41. A crankshaft 42 is connected to a piston 41*b* reciprocating in cylinder 41*a*. Crankshaft 42 extends in the vehicle width direction and is supported by crankcase 43 located in the back of cylinder 41*a*.

Continuously variable transmission 45 has a driving side pulley 45*a* and a driven side pulley 45*b*. Driving side pulley 45*a* is provided on and rotates with crankshaft 42. Driven side pulley 45*b* is provided on and rotates with a driven shaft 44 disposed in the back of crankshaft 42. A belt 45*c* transmitting torque to driven side pulley 45*b* from driving side pulley 45*a* is wound around driving side pulley 45*a* and driven side pulley 45*b*. Continuously variable transmission 45 slows down and transmits rotation of crankshaft 42 to driven shaft 44.

Rotation of driven shaft 44 is transmitted to an output shaft 49 disposed coaxially with driven shaft 44 through an automatic clutch 47 provided on driven shaft 44 and an intermediate shaft 48 disposed in the front of driven shaft 44. Rotations of a sprocket 49*a* mounted to output shaft 49 is transmitted to a sprocket rotating with axle 4*a* of rear wheel 4 through a chain.

As shown in FIGS. 7 and 8, engine unit 40 includes a transmission case 46, an air intake duct 51 and an air exhaust duct 52. Transmission case 46 covers continuously variable transmission 45 from the side. Air intake duct 51 sends outside air into transmission case 46 to cool belt 45*c* of continuously variable transmission 45. Air exhaust duct 52 discharges air from transmission case 46. As shown in FIG. 3, transmission case 46 is located on the side (a direction shown by W3 in FIG. 3) of main frame 22. As shown in FIGS. 3 and 7, transmission case 46 is covered with a cover 18 from the side.

As shown in FIGS. 7 and 8, an intake port 46a is formed in the front part of transmission case 46 and projects in the forward direction. Air intake duct 51 is connected to intake port 46a. As shown in FIG. 2, air intake duct 51 slants upward from intake port 46a and has an upper end part to which an air cleaner 53 is mounted. A tip duct 54 is mounted to an projects upwardly from an upper end part of air cleaner 53.

Figure 9:
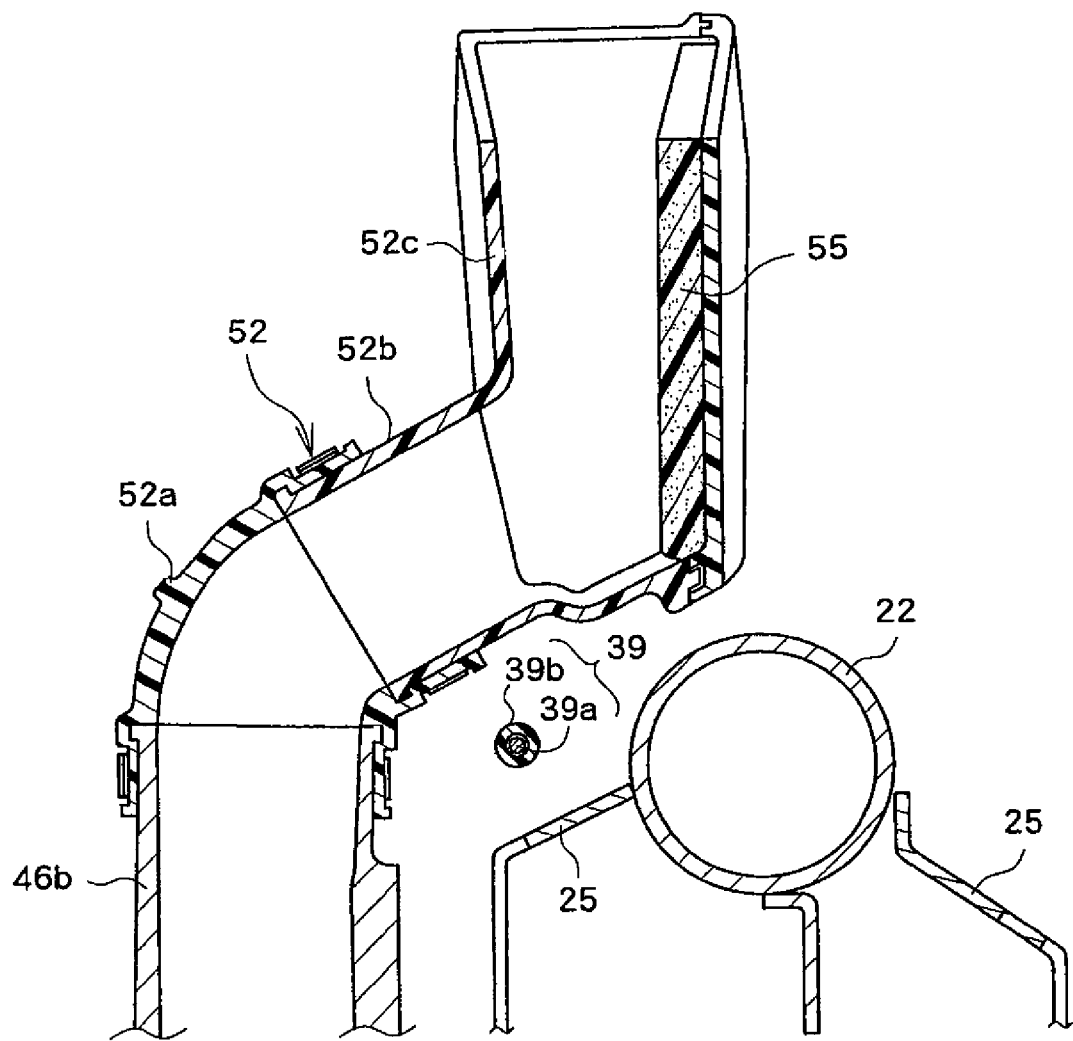
FIG. 9 is a sectional view taken along line IX-IX of FIG. 7.

An exhaust port 46b is formed in the rear part of transmission case 46. Exhaust port 46b projects in an upwardly slanting direction on the side of main frame 22. Air exhaust duct 52, which is made of a resin, is connected to exhaust port 46b. FIG. 9 is a sectional view taken along line IX-IX of FIG. 7. As shown in FIG. 9, air exhaust duct 52 has a bending part 52a, an inclining part 52b and an upper extending part 52c. Air exhaust duct 52 slants upward from exhaust port 46b on the side of main frame 22, and is then bent to the central part side (the main frame 22 side) in the vehicle width direction at bending part 52a. Inclining part 52b following bending part 52a slants upward, and is then upwardly bent. Upper extending part 52c upwardly extends following inclining part 52b. Upper extending part 52c has an inner wall to which an insulating material 55 is attached.

Outside air sucked from tip duct 54 is purified in air cleaner 53, and is then sent into transmission case 46 through air intake duct 51. Air in transmission case 46 is discharged through air exhaust duct 52 from exhaust port 46b of transmission case 46 (FIG. 3).

Rear wheel brake cable 39 is now described in detail. As shown in FIG. 4, rear wheel brake cable 39 has a front end part 39c connected to rear wheel brake lever 5L provided on the left of handlebar 5. Rear wheel brake cable 39 extends to the central part side (a direction shown by W1 in FIG. 4) in the vehicle width direction from front end part 39c, and is then bent in a downwardly slanting direction. Rear wheel brake cable 39, which extends in a downwardly slanting direction along inclining part 5e of handlebar 5, reaches to steering head 21 through the right of steering shaft 6. As described above, main frame 22 is connected to steering head 21. Rear wheel brake cable 39 extends to the side (in this example, the right) opposite to rear wheel brake lever 5L so as to sandwich main frame 22.

As shown in FIG. 4, a wire harness 13 is laid on the front of steering shaft 6 and connects hydraulic tube 12 to electric components (for example, a vehicle speed sensor, a speedometer and the like) set in parts of the vehicle body. Rear wheel brake cable 39, hydraulic tube 12 and wire harness 13 are bundled by a band 14 on the front of steering shaft 6.

As shown in FIG. 2 or 3, rear wheel brake cable 39 extends toward the rear part of the vehicle body along and on the right of main frame 22. Reinforcement part 28 is mounted to the upper part of and extends backward along main frame 22 so that the height of reinforcement part 28 from main frame 22 is gradually reduced in the backward direction. Rear wheel brake cable 39 extends along upper edge part 28a of reinforcement part 28, and is fastened to reinforcement part 28 by a mounting member 28b joined to reinforcement part 28.

Rear wheel brake cable 39 extends further along main frame 22 and is fastened to main frame 22 by a mounting member 22c joined to the rear part (between the front end part of seat rail 23 and the front end part of stay 24) of main frame 22 (FIGS. 3 and 7). Then, rear wheel brake cable 39 extends between main frame 22 and air exhaust duct 52. As shown in FIG. 9, rear wheel brake cable 39 is surrounded by exhaust port 46b of transmission case 46, inclining part 52b of air exhaust duct 52, main frame 22 and bracket 25.

Rear wheel brake cable 39 reaches rear end part 22b of main frame 22 through a space between air exhaust duct 52 and main frames 22 and further extends in a downwardly slanting direction toward the rear part of the vehicle body in the back of engine unit 40.

As described above, motorcycle 1 has a rear part on which rear arm 26 extends in the longitudinal direction (FIG. 5). Rear wheel brake cable 39 has a rear part extending toward the lower side from the upper side of rear arm 26. Rear wheel brake cable 39 has rear end part 39e connected to cam shaft lever 31 of rear wheel brake 30 on the lower side relative to rear arm 26. As shown in FIG. 5, a support member 26f is mounted to cross part 26d provided in the front part of rear arm 26. A support member 26i is mounted to an intermediate part of arm part 26c.

Figure 10:
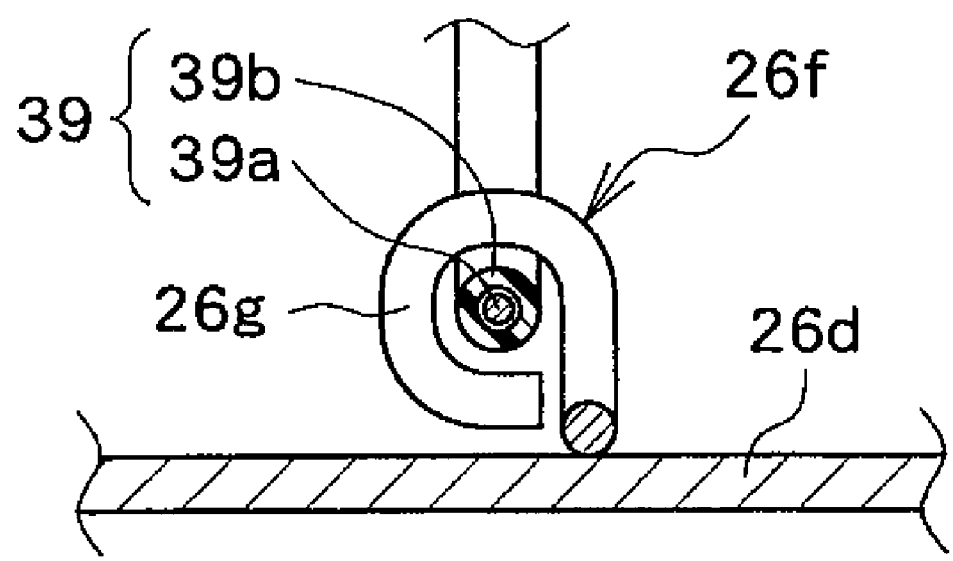
FIG. 10 is a sectional view taken along line X-X of FIG. 5.
Figure 11:
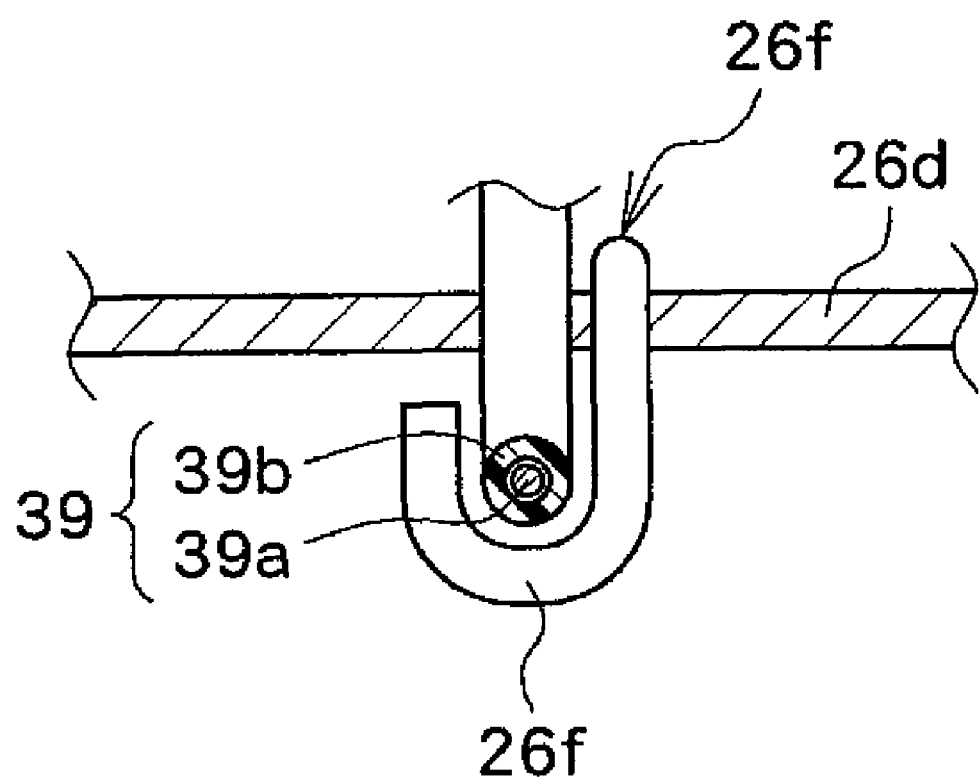
FIG. 11 is a sectional view taken along line XI-XI of FIG. 5.
Figure 12:
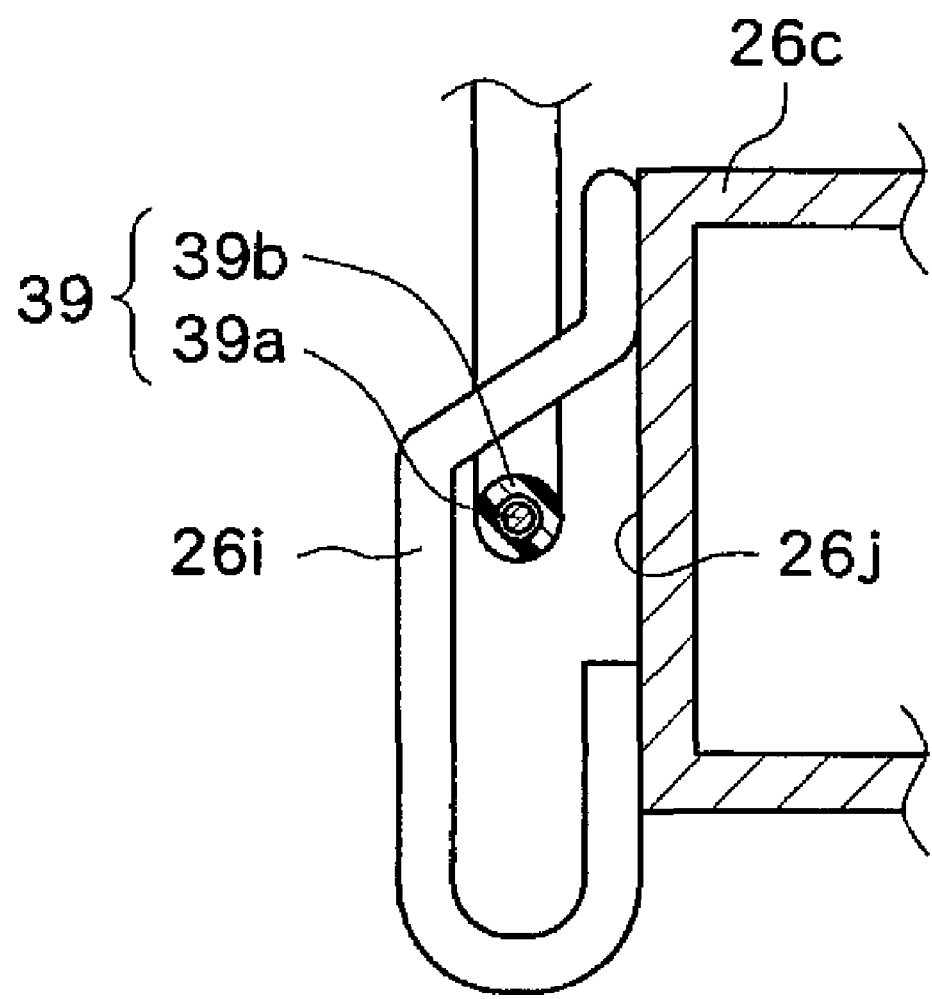
FIG. 12 is a sectional view taken along line XII-XII of FIG. 5.

FIG. 10 is a sectional view taken along line X-X of FIG. 5. FIG. 11 is a sectional view taken along line XI-XI of FIG. 5. FIG. 12 is a sectional view taken along line XII-XII of FIG. 5. As shown in FIG. 10, rear wheel brake cable 39 is passed through an annular part 26g provided in the front part of support member 26f. As shown in FIG. 11, a support part 26h supporting rear wheel brake cable 39 from the lower side is formed in the rear part of support member 26f. As shown in FIG. 12, support member 26i is joined to a wall part 26j of an arm part 26c of rear arm 26. Rear wheel brake cable 39 is sandwiched between support member 26i and wall part 26j to regulate inward movement of rear wheel brake cable 39.

As described above, rear wheel brake cable 39 has inner cable 39a and outer cable 39b. As shown in FIG. 5, a support part 33b is formed in and outwardly rises in the vehicle width direction from drum cover 33 of rear wheel brake 30. A rear end part 39d of outer cable 39b is mounted to support part 33b. Inner cable 39a extends further over rear end part 39d of outer cable 39b and has rear end part 39e mounted to cam shaft lever 31.

As shown in FIG. 5, rod 35, which is provided below rear arm 26, extends in the longitudinal direction of the vehicle body. Rear wheel brake cable 39 is laid above rod 35. Rod 35 is obliquely disposed so as to extend along the rear part of rear wheel brake cable 39. As shown in FIG. 6, rear wheel brake cable 39 extends on the central part side (the direction shown by W2 in FIG. 6) of right arm part 26c in the vehicle width direction. Rod 35 is disposed on the central part side relative to rear wheel brake cable 39 in the vehicle width direction.

Since rear wheel brake cable 39 extends along main frame 22 disposed at the center in the vehicle width direction in motorcycle 1 described above, rear wheel brake cable 39 has no wasteful length, and the transmitting loss of brake operation is reduced. Since rear wheel brake cable 39 is supported by main frame 22, swing of rear wheel brake cable 39 during traveling is prevented.

In motorcycle 1, main frame 22 slants downward toward the rear part of the vehicle body. Thus, rear wheel brake cable 39 extending along main frame 22 also slants downward toward the rear part of the vehicle body, and water entering into outer cable 39b of rear wheel brake cable 39 can be discharged from the lower end of outer cable 39b.

In motorcycle 1, rear wheel brake cable 39 extends toward the rear part of the vehicle body on the side opposite to rear wheel brake lever 5L so as to sandwich main frame 22. Rear wheel brake cable 39 can thereby be largely bent as compared to the case where rear wheel brake cable 39 is laid on the same side of main frame 22 as that of rear wheel brake lever 5L to reduce the transmitting loss of the brake operation caused by friction between inner cable 39a and outer cable 39b.

In motorcycle 1, engine unit 40, which includes engine 41 and continuously variable transmission 45, is disposed on the front side of rear wheel 4. A space is thereby provided for laying the rear part of rear wheel brake cable 39 in the back of engine unit 40.

Motorcycle 1 is provided with rear arm 26 that extends in the longitudinal 6 direction of the vehicle body and supports axle 4a of rear wheel 4 by rear end part 26b. Rear wheel brake cable 39 extends toward the lower side from the upper side of rear arm 26. Rear end part 39e is connected to rear wheel brake 30 on the lower side relative to rear arm 26. The rear part of rear wheel brake cable 39 thereby extends in a downwardly slanting direction so that rear end part 39e is the lowest.

Motorcycle 1 is provided with rod 35 extending in the longitudinal direction of the vehicle body below rear arm 26. Rear wheel brake cable 39 extends above rod 35. Rear wheel brake cable 39 is thereby protected on the lower side by rod 35.

In motorcycle 1, rear wheel brake cable 39 extends on the central part side relative to rear arm 26 in the vehicle width direction. Rod 35 extending in the longitudinal direction of the vehicle body is disposed on the central part side of rear wheel brake cable 39 in the vehicle width direction. Rear wheel brake cable 39 is thereby protected by rear arm 26 and rod 35.

Engine unit 40 of motorcycle 1 is provided with air intake duct 51 sending outside air into transmission case 46 storing continuously variable transmission 45, and air exhaust duct 52 discharging air from transmission case 46. Air exhaust duct 52 extends from transmission case 46 on the side of main frame 22, and rear wheel brake cable 39 is laid between main frame 22 and air exhaust duct 52. Rear wheel brake cable 39 is thereby protected by air exhaust duct 52.

Furthermore, in motorcycle 1, air exhaust duct 52 is made of the resin. A rise in temperature of air exhaust duct 52 is thereby suppressed, and the influence on rear wheel brake cable 39 of heat of air flowing in air exhaust duct 52 is reduced.

The present invention is not limited to motorcycle 1 described above, and various modifications can be carried out. For example, in the above description, rear wheel brake cable 39 is protected on the lower side by rod 35 regulating rotation of drum cover 33 of rear wheel brake 30. However, an exclusive member for protecting rear wheel brake cable 39 may instead be provided below rear wheel brake cable 39.

The invention claimed is:

1. A motorcycle comprising:
a rear wheel brake lever provided on a handlebar;
a rear wheel brake provided on a rear wheel;
a brake cable having a front end part connected to the rear wheel brake lever and a rear end part connected to the rear wheel brake; and
a main frame extending toward a rear part from a front part of the motorcycle, wherein
the main frame is disposed at a center of the motorcycle in a vehicle width direction and extends toward the rear part of the motorcycle on an upper side of an engine unit;
the brake cable extends toward the rear part from the front part of the motorcycle along only one side of the main frame; and
the brake cable extends toward the rear part of the motorcycle on the side of the main frame opposite to the rear wheel brake lever so that the main frame is positioned between the brake cable and the rear wheel brake lever.

2. The motorcycle according to claim 1, wherein the main frame slants downward toward the rear part of the motorcycle.

3. The motorcycle according to claim 1, wherein the engine unit includes an engine and a continuously variable transmission and is disposed on a front side of the rear wheel.

4. The motorcycle according to claim 1, further comprising a rear arm extending in a longitudinal direction of the motorcycle and having a rear end part supporting an axle of the rear wheel, wherein
the brake cable extends toward a lower side from an upper side of the rear arm, and
the rear end part of the brake cable is connected to the rear wheel brake on the lower side of the rear arm.

5. The motorcycle according to claim 4, further comprising a rod extending in the longitudinal direction of the motorcycle below the rear arm,
wherein the rear wheel brake cable extends above the rod.

6. The motorcycle according to claim 4, wherein the brake cable extends along a central portion of the motorcycle in the vehicle width direction relative to the rear arm and includes a rod extending in the longitudinal direction of the motorcycle on the central portion in the vehicle width direction relative to the brake cable.

7. The motorcycle according to claim 1, wherein the engine unit further comprises an air intake duct sending outside air into a case storing the continuously variable transmission, and an air exhaust duct discharging air in the case;
the air exhaust duct extends from the case on a side of the main frame; and
the brake cable extends between the main frame and the air exhaust duct.

8. The motorcycle according to claim 7, wherein the air exhaust duct is made of a resin.

* * * * *